# 2,771,485

PRODUCTION OF CARBAMATE COMPOUNDS

Adolf Weihe, Kronberg (Taunus), and Ullrich Hoffmann, Bad Homburg, Germany, assignors to Deutsche Gold- und Silber-Scheideanstalt vormals Roessler, Frankfurt am Main, Germany No Drawing. Application March 13, 1953,
Serial No. 342,278

Claims priority, application Germany March 14, 1952

7 Claims. (Cl. 260—482)

The present invention relates to an improved process for the production of carbamate compounds and particularly to an improved process for the production of carbamates containing a chloride atom.

In accordance with the invention, it was found that by reacting cyanogen chloride with compounds containing two or more hydroxyl groups, chlorine containing carbamic acid esters could be obtained in a very simple manner. In the simplest case, that is, the reaction between a diol and cyanogen chloride, the reaction is represented essentially by the following equation:

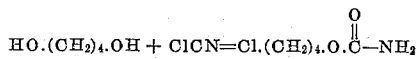

The reaction involved is smooth and can be carried out without adjuvant substances, catalysts and the like.

In the instance of the reaction between butane diol and cyanogen chloride given in the above equation, it is merely necessary to melt the diol and heat it to 80° C. and to pass cyanogen chloride therethrough. The cyanogen chloride will be taken up and no exhaust gases will appear as long as the increasing thickening of the reaction mixture permits the gas to pass therethrough. In the case of butane diol, this point is reached when about 60% of the diol has been converted.

Complete conversion, that is, take up of the theoretical quantity of cyanogen chloride can be achieved with the aid of a suitable diluent, such as, for example, glacial acetic acid, benzol and the like, which either can be added during the course of the reaction to keep the chlorourethane formed in solution or by adding it before the start of the reaction. In the latter instance, however, two layers are formed initially.

Besides 1 chlorobutyl carbamate-4, butane diol biscarbamate and dichlorobutane are formed as by-products. With increase of temperature, production of undesired tetrahydrofurane is promoted and the water produced disturbs the reaction. The quantity of the by-products produced depends upon the reaction conditions, and depending upon the selection of such conditions, the formation of carbamates containing chlorine or of diurethanes can be promoted. The carbamates containing chlorine can be obtained in high yields, for example, by adding the diol to the cyanogen chloride which, if desired, can be appropriately diluted. In such instance, acid resistant pressure vessels are employed which, after being charged with the cyanogen chloride, are then supplied with the diol under pressure.

The reaction between cyanogen chloride and polyvalent alcohols is of general application and provides a method for the production of a wide variety of reactive compounds preferably for purposes of the organic synthesis.

The following examples will serve to illustrate the process according to the invention.

Example 1

270 g. of 1,4 butane diol were melted and heated to 80° C. in a cylindrical 1 liter glass vessel provided with a thermometer, gas introducing tube with frit, and reflux condenser. A strong stream of cyanogen chloride was introduced through the tube below the surface of the melted 1,4 butane diol. The cyanogen chloride was completely taken up by the melt and after about 30 minutes the temperature was raised thereby to about 120° C. During further introduction of cyanogen chloride the temperature gradually sinks to 85° C. and precipitation of colorless crystals began, which after about 2 hours caused the reaction mixture to become pasty which hindered the passage of the gas therethrough. The stream of cyanogen chloride was then interrupted and it was ascertained that the gain in weight was 95 g. which corresponded to about half the quantity of cyanogen chloride required for a complete conversion.

The reaction mixture was then mixed with 600 g. of water and heated to boiling while stirring. The unconverted diol went into solution, and dichlorobutane settled at the bottom together with a small quantity of buane diol diurethane. The resultant aqueous solution was concentrated under the vacuum of a water jet pump whereupon the 1-chlorobutyl-4-carbamate

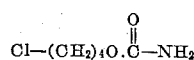

separated out in the form of fine colorless crystals. Contrary to the butane diol biscarbarmate, the chlorobutyl carbamate is easily soluble in water and many organic solvents at elevated temperatures. It melts at 69° C. and is rather volatile. The differences in solubility between the chlorobutyl carbamate and the biscarbamate render a quantitative separation possible.

The quantity of chlorobutyl carbamate obtained, after drying in a desiccator was 212 g. A simple analytical determination thereof was made by boiling for several hours with

under reflux and determining the ammonia which escaped and determining the chlorine by titration with silver nitrate after acidification.

An elementary analysis of two samples gave the following results:

| Results, Mol. Wt. | Calculated, Percent | Found, Percent | Percent |
|---|---|---|---|
| C₅=60.05 | 39.61 | 39.19 | 40.73 |
| H₁₀=10.08 | 6.65 | 6.37 | 6.84 |
| N=14.01 | 9.24 | 10.20 | 8.54 |
| Cl=35.46 | 23.39 | 21.00 | 21.92 |
| O₂=32.00 | 21.11 | 22.43 | 22.00 |
| 151.60 | 100.00 | 99.19 | 100.03 |

The molecular weight of 151.6 was confirmed by the method of Rast, Ber. 55, 1051 and 3727.

Example 2

270 g. of 1,4 butane diol (3 mol) were mixed with 140 g. of glacial acetic acid in the same apparatus as employed in Example 1 and the resulting solution was heated to 80° C. A strong stream of cyanogen chloride was introduced and after about 3 hours, the reaction mixture reached a temperature of 95° C. and the precipitation of colorless crystals commenced which after 30 more minutes filled the greater part of the reaction vessel. The reaction vessel was cooled and filtered under suction to separate the crystals formed. The filtrate was treated further with cyanogen chloride while the crystals were recrystallized from methanol and 22 grams of butane diol biscarbamate (obtained as the residue insoluble in methanol) were obtained. Both substances were completely colorless and respectively had sharp melting points of 69° C. and 198° C.

After 3 hours further treatment of the filtrate with cyanogen chloride under the same conditions as above, a further yield of 122 g. of 1-chlorobutyl-4-carbamate and 17 g. of butane diol biscarbamate were obtained so that the total yields of both substances respectively were 272 g. and 39 g.

The unconverted butane diol remaining in the mother liquor can be recovered, for example, by boiling with benzol in which the diol is insoluble while the remaining substances are dissolved.

Example 3

In attempt to increase the conversion of the butane diol by removing the dichlorobutane formed from the reaction mixture, the procedure of Example 2 was repeated except that the glacial acetic acid was replaced by 300 g. of benzol.

After a copious quantity of crystals had been produced, the reaction mixture was filtered under suction and the solid crystals separated as above from methanol. The filtrate separated into two layers, the upper of which was a benzol solution of dichlorobutane and the lower of which substantially consisted of unconverted butane diol. The latter was again mixed with 300 g. of benzol and reacted with cyanogen chloride as described.

In this way, 305 g. of 1-chlorobutyl-4-carbamate (about 2 mol.) and 85 g. butane diol biscarbamate (about ½ mol.) where obtained from 270 g. of butane diol (3 mol.).

Example 4

100 g. of finely powdered pentaerythritol were introduced into 400 g. of glacial acetic acid and the mixture heated to boiling. Cyanogen chloride was introduced until no more was taken up. This required 4 to 5 hours. The reaction mixture was poured into ice water whereupon colorless crystals separated out which upon analysis were indicated to be the following compound.

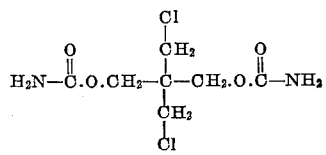

This dichloro biscarbamate compound can be condensed with aldehydes to hardenable resins having high softening points.

Example 5

A silver plated 1 liter autoclave was filled with a solution of 242 g. (4 mol.) of cyanogen chloride in 500 g. methylene chloride cooled to —25° C. The autoclave was closed and heated to about 60° C. at which temperature a pressure of about 5 atmospheres gauge pressure developed in the autoclave.

360 g. (4 mol.) of butane diol were pumped slowly into the autoclave under constant stirring over a period of 2½ hours. The temperature increased slightly, but the quantity of the diol added was regulated so that without any supplemental heating the temperature of the reaction mixture remained between 60° and 65° C. At the end of the reaction, the pressure diminished to about 1.5 atmospheres gauge pressure. The reaction mixture was stirred for a further 2 hours at 60 to 65° C. After cooling the contents of the autoclave to 15° C. they were extracted by boiling with 500 g. of methylene chloride and filtered hot. The methylene chloride solution contained chlorobutylcarbamate and a small amount of dichlorobutane. The solution was strongly cooled and the substantially colorless crystals which precipitated out were recrystallized from water. After drying at 40° C. a yield of 332 g. of pure chlorobutylcarbamate were obtained. The residue filtered off consists of 176 g. of the biscarbamate. 122 g. of crude dichlorobutane were recovered from the methylene chloride solution.

Example 6

A silver plated 1 liter autoclave was filled with a solution of 300 g. of cyanogen chloride in 400 g. of methylene chloride cooled to —25° C. and after closing the autoclave the contents were heated to 60° C. and 248 g. of water-free ethylene glycol were pumped into the autoclave over a period of three hours under constant stirring. The reaction proceeded similarly to that described in Example 5. The reaction product was completely soluble in the methylene chloride and a small quantity of unreacted glycol collected at the bottom. The conversion was 86% of the theoretical and only chloroethyl carbamate $$Cl—CH_2.CH_2—O.CO.NH_2$$

of a melting point of 70.5° C. could be found as the reaction product.

|    | Calculated, percent | Found, percent |
|----|---------------------|----------------|
| C  | 29.15               | 28.40          |
| H  | 4.89                | 5.11           |
| N  | 11.33               | 11.03          |
| Cl | 28.74               | 27.29          |
| O  | 25.91               |                |
|    | 100.02              |                |

Example 7

A stainless steel 20 liter autoclave with magnetic stirrer was filled with a solution of 2.42 kgs. of cyanogen chloride in 2.6 kgs. of benzene. The solution was cooled to a temperature of about 0° C.

The autoclave was closed and heated to about 70° C. A solution of 6 kgs. of 1'-3'-dioxy-1-3-4-6 tetramethylbenzene according to the formula

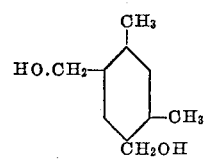

in 6 kgs. of benzene were pumped into the autoclave under constant stirring over a period of 3½ hours. The autoclave was heated in such a way that the temperature of the reaction mixture remained at about 80° C. The pressure increased gradually to about 7–8 atmosphere gauge pressure but diminished to about 1.5 atmospheres gauge pressure at the end of the reaction. The reaction mixture was stirred for a further hour at 70° C. About 500 cc. of benzene with the excess cyanogen chloride were then filtered off.

After cooling the reaction substance substantially consisted of a crystal pulp of carbamate containing chlorine in benzene.

The main product obtained with a yield of 86% theoretical corresponds to the following formula:

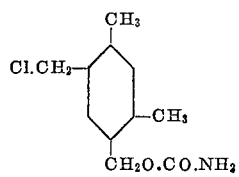

Example 8

In the same way as described in Example 7 the naphthalene compound

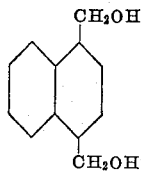

may be converted into a carbamate containing chlorine.

Example 9

Both diethylene glycol and β,β'-di-hydroxy diethyl sulfide may be converted into a carbamate containing chlorine in the same manner as described in Example 5 (butane diol). A silver plated 2 liter shaking autoclave is filled with 561 grs. of cyanogen chloride (11 mol.) in 500 grs. of tetrachloromethane at a temperature of −20° C. After closing the autoclave the contents were heated to 65° C. and 1.07 kgs. of diethylene glycol were pumped into the autoclave over a period of 2 hours. The temperature increased to 76° C. without any supplemental heating and gradually decreased to 60° C. after addition of diglycol whilst the pressure diminished to about 1.5 atmospheres gauge pressure. The shaking was continued for one hour without supplemental heating and the reaction product then allowed to cool off. The crystallized carbamate containing chlorine suspended in tetrachloromethane is obtained in a yield of 82% of the theoretical and corresponds to the formula $$Cl.CH_2.O.CH_2.CH_2—O.CO.NH_2$$

In addition to the carbamate containing chlorine the reaction mixture contained also the biscarbamate of the diglycol $$H_2N.CO.O.CH_2.CH_2.O.CH_2.CH_2O.CO\underset{NH_2}{|}$$

and a dichloride of the formula $$Cl.CH_2.CH_2.O.CH_2.CH_2.Cl$$

The latter substance is known to be the oxygen analog of the dichlorodiethyl sulfide, a toxic substance which should be handled with great caution.

The following rules indicate the best temperature ranges for the reaction. It has proved to be advantageous to choose the temperature where the reaction starts. Generally, the reaction then continues without supplemental heating. A substantial increase of the temperature above the starting point leads to undesired side reactions. Thus, for instance, tetrahydrofuran

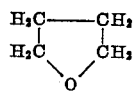

and water are formed from butane diol 1,4 and finally the tetrahydrofuran leads to the formation of ammonium chloride from cyanogen chloride.

The process according to the invention substantially refers to the conversion of compounds with aliphatic hydroxyl groups with cyanogen chloride. Phenol is practically unsuitable for the new process.

We claim:

1. A process for the production of carbamic acid esters which comprises heating cyanogen chloride and an organic compound containing at least two hydroxyl groups attached to aliphatic carbon atoms selected from the group consisting of short chain saturated aliphatic hydrocarbon poly alcohols, lower poly alkylol substituted benzenes, lower poly alkylol substituted naphthalenes, short chain alkylene ether glycols and short chain alkylene thioether glycols to a reaction temperature between 60 and 120° C.

2. A process for the production of chlorocarbamates and biscarbamates which comprises heating cyanogen chloride and an organic compound containing at least two hydroxyl groups attached to aliphatic carbon atoms selected from the group consisting of short chain saturated aliphatic hydrocarbon poly alcohols, lower poly alkylol substituted benzenes, lower poly alkylol substituted naphthalenes, short chain alkylene ether glycols and short chain alkylene thioether glycols to a reaction temperature between 60 and 120° C.

3. A process for the production of carbamic acid esters which comprises introducing cyanogen chloride into an organic compound in the liquid state containing at least two hydroxyl groups attached to aliphatic carbon atoms selected from the group consisting of short chain saturated aliphatic hydrocarbon poly alcohols, lower poly alkylol substituted benzenes, lower poly alkylol substituted naphthalenes, short chain alkylene ether glycols and short chain alkylene thioether glycols heated to a reaction temperature between 60 and 120° C.

4. The process of claim 1 in which said reaction is carried out in the presence of an inert organic solvent.

5. A process according to claim 1, in which the compound containing at least two hydroxy groups is introduced gradually into a confined space containing a quantity of cyanogen chloride.

6. A process according to claim 1 in which said reactants are heated to reaction temperature under super-atmospheric pressure.

7. A chlorosubstituted carbamic acid ester of the general formula $$Cl—R—O—\overset{O}{\underset{}{\overset{\|}{C}}}—NH_2$$

in which R is a bivalent araliphatic radical carrying the Cl— and the $$—O—\overset{O}{\underset{}{\overset{\|}{C}}}—NH_2$$

attached to aliphatic carbon atoms.

References Cited in the file of this patent

UNITED STATES PATENTS

| | | |
|---|---|---|
| 2,384,074 | Chenicek | Sept. 4, 1945 |
| 2,408,893 | Swan et al. | Oct. 8, 1946 |
| 2,431,140 | Rogers | Nov. 18, 1947 |
| 2,585,826 | Olsen | Feb. 12, 1952 |

OTHER REFERENCES

Dox et al.: J. Am. Chem. Soc. 45 (1923), 723–7.